US009196092B2

(12) United States Patent
McDermott et al.

(10) Patent No.: US 9,196,092 B2
(45) Date of Patent: Nov. 24, 2015

(54) MULTIPLE VOLUME RENDERINGS IN THREE-DIMENSIONAL MEDICAL IMAGING

(75) Inventors: Bruce A. McDermott, Bellevue, WA (US); Mervin Mencias Smith-Casem, Renton, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 272 days.

(21) Appl. No.: 13/493,812

(22) Filed: Jun. 11, 2012

(65) Prior Publication Data

US 2013/0329978 A1    Dec. 12, 2013

(51) Int. Cl.
*G06K 9/00*      (2006.01)
*G06T 19/00*      (2011.01)
*G06T 15/08*      (2011.01)
*G06T 15/30*      (2011.01)

(52) U.S. Cl.
CPC ............ *G06T 19/00* (2013.01); *G06T 15/08* (2013.01); *G06T 15/30* (2013.01); *G06T 2210/41* (2013.01); *G06T 2219/008* (2013.01); *G06T 2219/028* (2013.01)

(58) Field of Classification Search
None
See application file for complete search history.

(56) References Cited

U.S. PATENT DOCUMENTS 7,079,674 B2 * 7/2006 Paragios et al. ............... 382/128
7,433,504 B2   10/2008 Deischinger et al.
7,519,211 B2 * 4/2009 El Fakhri et al. ............. 382/128
7,714,856 B2   5/2010 Waldinger et al.
7,848,557 B2 * 12/2010 Kadrmas et al. .............. 382/131
2004/0081340 A1 * 4/2004 Hashimoto ................... 382/128
2006/0069536 A1 * 3/2006 Butsev et al. ..................... 703/6
2007/0247454 A1 * 10/2007 Rahn et al. .................... 345/419
2008/0097210 A1 * 4/2008 Salgo et al. ................... 600/445
2009/0003665 A1 * 1/2009 Berg et al. .................... 382/128
2009/0226064 A1 * 9/2009 El Fakhri et al. ............. 382/128
2009/0304250 A1 * 12/2009 McDermott et al. ......... 382/131
2009/0306503 A1   12/2009 Srinivasan et al.
2010/0021031 A1 * 1/2010 Brockway et al. ............ 382/128
2010/0249589 A1 * 9/2010 Lysyansky et al. ........... 600/440
2011/0091086 A1   4/2011 Seko et al.
2012/0095341 A1 * 4/2012 Shiki et al. ................... 600/443
2012/0245465 A1 * 9/2012 Hansegard et al. ........... 600/443
2012/0253190 A1 * 10/2012 Gauthier et al. .............. 600/431
2012/0290976 A1 * 11/2012 Lahm et al. ................... 715/810
2013/0195335 A1 * 8/2013 Gorman et al. ............... 382/131

OTHER PUBLICATIONS

Analyze 10.0 Essential Training Guide, "Exercise 12: Volume Render Basic Rendering Controls," pp. 43-45, printed May 11, 2012.

* cited by examiner

*Primary Examiner* — Bhavesh Mehta
*Assistant Examiner* — Oneal R Mistry (57) ABSTRACT

Clipping is provided for volume rendering in three-dimensional medical imaging. Rather than a single or even two clipping planes, an enclosed clipping volume isolates a region of interest. More than one volume rendering may be formed from the data of the clipping volume. The volume renderings from different directions, such as opposite directions, may be displayed substantially simultaneously. For imaging a valve or other structure with multiple views of interest, the clipping volume defines the valve or structure region and rendering from the multiple views provides desired diagnosis information.

19 Claims, 3 Drawing Sheets

MULTIPLE VOLUME RENDERINGS IN THREE-DIMENSIONAL MEDICAL IMAGING

BACKGROUND

The present embodiments relate to medical diagnostic imaging. In particular, clipping is used in volume rendering.

Ultrasound or other medical imaging modalities may be used to scan a patient. For example, echocardiography is a commonly used imaging modality to visualize the structure of the heart. In 3D Echocardiography, images of the heart may be computed by a multi-planar reconstruction (MPR) or by volume rendering (VR). Standard views are captured to better visualize the cardiac structures. For example, in the apical four-chamber (A4C) view, all four cavities, namely left and right ventricles, and left and right atria, are present. In the apical two-chamber (A2C) view, only the left ventricle and the left atrium are present.

Ultrasound data may be acquired at a sufficient rate to allow three-dimensional ultrasound imaging in real-time. For example, a combination of one or more MPR's, which show images of specific planes through a 3-dimensional volume and a volume rendering (VR), which shows a 3-dimensional representation of a view of the data from a user-selectable viewing direction, is provided. Non-real-time three-dimensional ultrasound imaging may also be provided. In other examples, a VR is provided without an MPR.

The data may include information not desired in the VR. This information may occlude a region of interest in the image. To remove undesired information, a clipping plane may be used. Some systems provide for two clipping planes. The data representing locations on one side of a clipping plane or between two clipping planes is used for VR. However, insufficient clipping may result.

To view the selected portion of the volume from a different direction, the user changes the viewing direction. Changing between different view directions may cause a distracting or disorienting jump. User changes that incrementally change the clip plane or viewing direction may lack repeatability, preventing the user from consistently achieving the desired views.

BRIEF SUMMARY

By way of introduction, the preferred embodiments described below include methods, computer-readable media and systems for volume rendering in three-dimensional medical imaging. Rather than a single or even two clipping planes, a clipping volume isolates a region of interest. The dimensions of the clipping volume may be defined by adjusting the dimensions of a 2D projection of the clipping volume on MPR planes. More than one volume rendering may be formed from the data of the clipping volume. The volume renderings from different directions, such as opposite directions, may be displayed substantially simultaneously. In an embodiment for imaging a heart valve or other structure with multiple views of interest, the clipping volume defines the valve or structure region and rendering from the multiple views provides desired diagnosis information.

In a first aspect, a method is provided for volume rendering in three-dimensional medical imaging. Medical data representing at least a portion of a heart of a patient is obtained. The portion includes a valve having in-flow and out-flow regions. A selection of a clipping volume surrounding the valve and excluding locations of the portion outside the clipping volume is received. The valve is rendered from the medical data as viewed from the in-flow region and as viewed from the outflow region. The rendering uses the medical data representing the clipping volume and does not use the medical data representing the locations outside the clipping volume. The first and second images of the rendered valve are displayed as viewed from the in-flow region and as viewed from the outflow region substantially simultaneously.

In a second aspect, a system is provided for volume rendering in three-dimensional medical imaging. A memory is operable to store data representing a volume of a patient. A processor is configured to: generate, in response to input from the user input, a clipping shape having an enclosed volumetric surface, clip the volume with the clipping shape, the clipping defining a sub-set of the data, and volume render different images from the sub-set, the different images being of the sub-set of data from different viewing directions. A display is operable to display the different images.

In a third aspect, a non-transitory computer readable storage medium has stored therein data representing instructions executable by a programmed processor for volume rendering in three-dimensional medical imaging. The storage medium includes instructions for obtaining medical data representing a volume of a patient, receiving selection of a sub-volume of the volume, rendering, from the medical data, the sub-volume from first and second viewing directions, the rendering using the medical data representing the sub-volume and not using the medical data representing locations outside the sub-volume, and displaying first and second images of the rendered sub-volume from the first and second viewing directions substantially simultaneously.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND SPECIFIC EMBODIMENTS

Simultaneous volume renderings of a three-dimensional (3D) volume data set are selected and displayed. A clipping tool for easy selection and viewing of a desired 3D region in the 3D volume data set is provided. The simultaneous volume renderings are of the selected region. For example, the viewing direction of one volume rendering is from a top of a clipping box, and the viewing direction of another volume rendering is from a bottom of the clipping box. The clipping being a 3D shape and the simultaneous display may be used separately or in combination.

In one example embodiment, heart valve functionality is analyzed with 3D ultrasound imaging. It is desirable to view the valve from both the inflow and outflow sides to assess the heart valve with 3D ultrasound. Rather than separately position a limited number of clipping planes, a 3D clipping shape is positioned to extract the data associated with the valve while limiting information from other locations of the heart. Multiple renderings are displayed based on the clipping, providing useful information without requiring sequential navigation or flipping between views.

Figure 1:
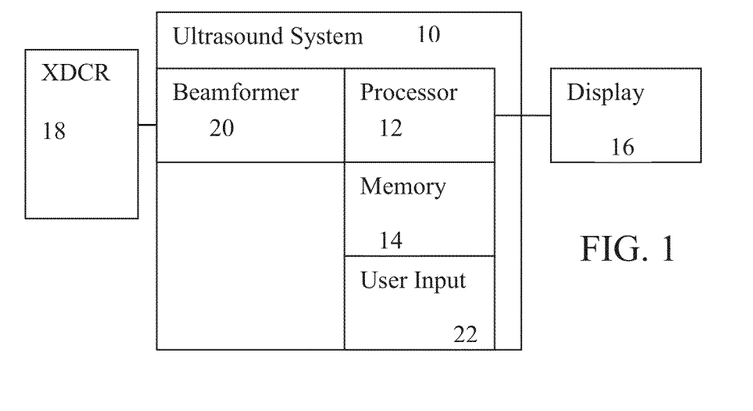
FIG. 1 is a block diagram of one embodiment of a medical imaging system.

FIG. 1 shows a medical diagnostic imaging system 10 for volume rendering in three-dimensional medical imaging. The system 10 is a medical diagnostic ultrasound imaging system, but may be a computer, workstation, database, server, or other imaging system. Alternatively, the system 10 is another modality of medical imaging system, such as a computed tomography system, a magnetic resonance system, a positron emission tomography system, a single photon emission computed tomography system, or combinations thereof.

The system 10 includes a processor 12, a memory 14, a display 16, a transducer 18, a beamformer 20, and a user input 22. Additional, different, or fewer components may be provided. For example, the system 10 includes a B-mode detector, Doppler detector, harmonic response detector, contrast agent detector, scan converter, filter, combinations thereof, or other now known or later developed medical diagnostic ultrasound system components. As another example, the system 10 does not include the transducer 18 and the beamformer 20, but is instead a computer, server, or workstation for rendering images from stored or previously acquired data.

The transducer 18 is a piezoelectric or capacitive device operable to convert between acoustic and electrical energy. The transducer 18 is an array of elements, such as a one-dimensional, multi-dimensional or two-dimensional array. Alternatively, the transducer 18 is a wobbler for mechanical scanning in one dimension and electrical scanning in another dimension.

The beamformer 20 includes a transmit beamformer and a receive beamformer. The beamformer 20 is connectable with the ultrasound transducer 18. For example, a transducer assembly including the transducer 18 and a cable plugs into one or more transducer ports on the system 10.

The transmit beamformer portion is one or more waveform generators for generating a plurality of waveforms to be applied to the various elements of the transducer 18. By applying relative delays and apodizations to each of the waveforms during a transmit event, a scan line direction and origin from the face of the transducer 18 is controlled. The delays are applied by timing generation of the waveforms or by separate delay or phasing components. The apodization is provided by controlling the amplitude of the generated waveforms or by amplifiers. To scan a region of a patient, acoustic energy is transmitted sequentially along each of a plurality of scan lines. In alternative embodiments, acoustic energy is transmitted along two or more scan lines simultaneously or along a plane or volume during a single transmit event.

The receive beamformer portion includes delays, phase rotators, and/or amplifiers for each of the elements in the receive aperture. The receive signals from the elements are relatively delayed, phased, and/or apodized to provide scan line focusing similar to the transmit beamformer, but may be focused along scan lines different than the respective transmit scan line. The delayed, phased, and/or apodized signals are summed with a digital or analog adder to generate samples or signals representing spatial locations along the scan line. Using dynamic focusing, the delays, phase rotations, and apodizations applied during a given receive event or for a single scan line are changed as a function of time. Signals representing a single scan line are obtained in one receive event, but signals for two or more (e.g., 64) scan lines may be obtained in a single receive event. In alternative embodiments, a Fourier transform or other processing is used to form a frame of data by receiving in response to a single transmit.

The system 10 uses the transducer 18 to scan a volume. Electrical and/or mechanical steering by the beamformer 20 allows transmission and reception along different scan lines in the volume. Any scan pattern may be used. In one embodiment, the transmit beam is wide enough for reception along a plurality of scan lines, such as receiving a group of up to 24 or more (e.g., 64) receive lines for each transmission. In another embodiment, a plane, collimated or diverging transmit waveform is provided for reception along a plurality, large number, or all scan lines.

Ultrasound data representing a volume is provided in response to the scanning. A frame of data is acquired by scanning over a complete pattern with the beamformer. The frame of data represents a volume, such as the heart. The ultrasound data is beamformed, detected, and/or scan converted. The ultrasound data may be in any format, such as polar or Cartesian coordinates, Cartesian coordinate with polar coordinate spacing between planes, or other format. In other embodiments, the ultrasound data is acquired by transfer, such as from a removable media or over a network. Other types of medical data representing a volume may be acquired.

The memory 14 is a buffer, cache, RAM, removable media, hard drive, magnetic, optical, or other now known or later developed memory. The memory 14 may be a single device or group of two or more devices. The memory 14 is shown within the system 10, but may be outside or remote from other components of the system 10.

The memory 14 stores the ultrasound data. For example, the memory 14 stores flow components (e.g., velocity, energy or both) and/or B-mode ultrasound data. The medical image data is a three-dimensional data set, or a sequence of such sets. For example, a sequence of sets over a portion, one, or more heart cycles of the heart are stored. The data of each set (frame of data) represents a volume of a patient, such as representing a portion or all of the heart.

For real-time imaging, the ultrasound data bypasses the memory 14, is temporarily stored in the memory 14, or is loaded from the memory 14. Real-time imaging may allow delay of a fraction of seconds, or even seconds, between acquisition of data and imaging. For example, real-time imaging is provided by generating the images substantially simultaneously with the acquisition of the data by scanning. Substantially provides for processing delay. While scanning to acquire a next or subsequent set of data, images are generated for a previous set of data. The imaging occurs during the same imaging session used to acquire the data. The amount of delay between acquisition and imaging for real-time operation may vary, such as a greater delay for initially locating planes of a multi-planar reconstruction with less delay for subsequent imaging. In alternative embodiments, the ultrasound data is stored in the memory 14 from a previous imaging session and used for imaging without concurrent acquisition.

The memory 14 is additionally or alternatively a non-transitory computer readable storage medium with processing instructions. The memory 14 stores data representing instructions executable by the programmed processor 12 for volume rendering in three-dimensional medical imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The user input 22 is a button, slider, knob, keyboard, mouse, trackball, touch screen, touch pad, combinations thereof, or other now known or later developed user input device. The user may operate the user input 22 to position a clipping shape (e.g., clipping object), set rendering values (e.g., select a type of rendering or set an offset viewing angle), or operate the system 10. The processor 12 renders different views of a selected sub-volume in response to user activation of or user sub-volume selection with the user input 22. For example, the user selects an application (e.g., valve view), selects a clipping position, and/or otherwise defines a viewing direction with the user input 22. In response, the processor 12 generates one or more two-dimensional representations of the selected sub-volume (e.g., one or more volume rendered images).

The processor 12 is a general processor, digital signal processor, three-dimensional data processor, graphics processing unit, application specific integrated circuit, field programmable gate array, digital circuit, analog circuit, combinations thereof, or other now known or later developed device for processing medical data. The processor 12 is a single device, a plurality of devices, or a network. For more than one device, parallel or sequential division of processing may be used. Different devices making up the processor 12 may perform different functions, such as a user interface processor and an image rendering graphics processing unit operating separately.

In one embodiment, the processor 12 is a control processor or other processor of a medical diagnostic imaging system, such as a medical diagnostic ultrasound imaging system processor. In another embodiment, the processor 12 is a processor of an imaging review workstation or PACS system. The processor 12 operates pursuant to stored instructions to perform various acts described herein, such as acts for positioning a 3D clipping object and/or simultaneous display of different views of a selected volume.

Figure 2:
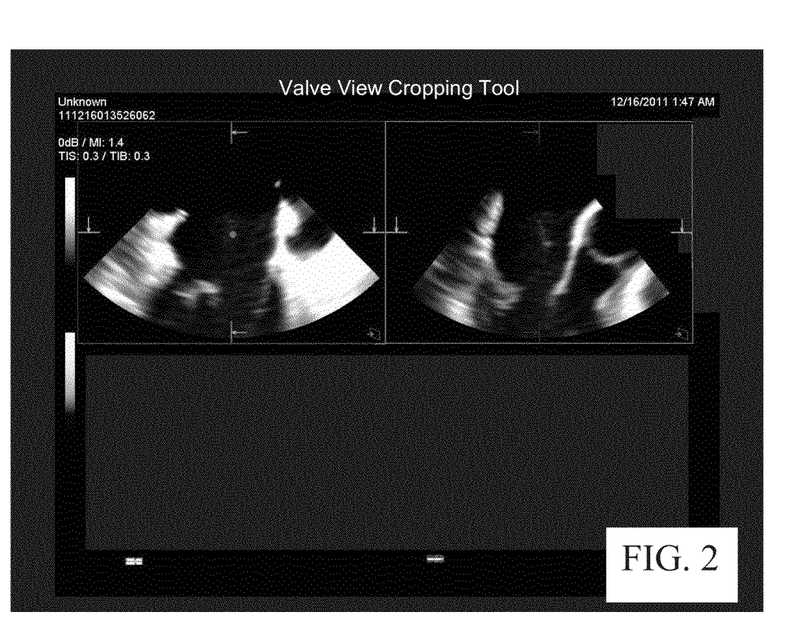
FIG. 2 shows example planar medical images to be used for clipping navigation, according to one embodiment.

The processor 12 generates a planar image representing a plane in the volume. In one example embodiment, the processor 12 generates a multi-planar reconstruction from a frame of data. For example, FIG. 2 shows two orthogonal planar images generated from data representing a volume of the heart. Only one or more than two planar images may be generated. In the example of FIG. 2, a quad display is provided for two planar images and two images rendered from a volume.

The position of the plane or planes relative to the volume is set by the user. For example, the user may scroll to move a plane orthogonal to a current position of the plane. Trackball or pointer device may be used to position and resize the clipping planes. Controls for rotation along any axis may be provided. In alternative embodiments, the processor 12 uses pattern matching, filtering, feature tracking, or other processing to automatically position the plane or planes. The planes may be automatically set to be orthogonal to each other, but other relationships (e.g., angles) with or without pre-determination may be used.

The data for the MPR images is extracted from the frame of data representing the volume. Once positioned, the data from the volume is mapped to the plane. For the locations on the plane (e.g., pixel locations), the data from the nearest location in the volume grid (e.g., voxel) is selected. Alternatively, data for each plane location is interpolated from two or more adjacent volume locations. In an alternative embodiment, the planar image is for a scan plane separately acquired from the volume data or acquired as part of scanning the volume. Rather than extraction from the volume, the planar scan data is used to generate the image, such as a single or bi-plane B-mode image.

The planar image is used to position a clipping shape. The processor 12, in conjunction with the user input 22, generates the clipping shape. The clipping shape is an enclosed volumetric surface. For example, the shape is a rectangular prism. Spherical, irregular, or other enclosed shapes may be used. In alternative embodiments, the shape not enclosed, such as being a curved surface.

The shape is predetermined. For example, the shape is set as a rectangular prism. The user may control different characteristics of the rectangular prism, such as the size or orientation. Alternatively, the shape may be created by the user, such as provided by user selection of vertices or tracing to define the shape.

The clipping shape is generated by the processor 12 in response to input from the user input 22. The user input 22 may indicate selection of activation of the clipping shape, such as selection of an icon, menu item, or application tool (e.g., an "aortic valve view" tool). The user input 22 may indicate designation of location, size, or orientation of the clipping shape. Using the multi-planar reconstructions, the user may indicate in one or more of the multiple images the characteristics in all three-dimensions.

Figure 3:
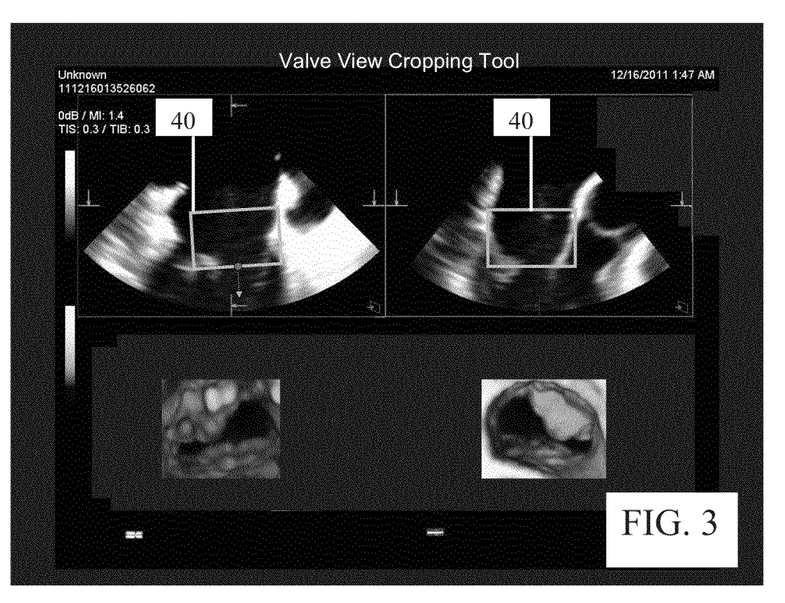
FIG. 3 shows example planar medical images being used for clipping navigation, with additional medical volume rendered images, in another embodiment.

In one embodiment, the processor 12 extrapolates the volumetric clipping shape from a two-dimensional shape. For example, FIG. 3 shows positioning a box 40 on both planar images. The box 40 is positioned by indicating the locations for two diagonal corners. Alternatively, the box 40 is positioned about a selected center location. Other box positioning may be used. The user may drag, expand, shrink, rotate or otherwise manipulate the size and location of the box 40 in one of the images.

The box 40 is extrapolated to be volumetric. The depth relative to the planar image may be predetermined or have a fixed aspect ratio with one or more of the width or height (e.g., the lines shown on the planar image). The resulting location of the rectangular prism in the other planar image is shown as a box 40. In an alternative embodiment, the user may adjust the box 40 in either image and any resulting change in the volumetric clipping shape (e.g., change in size or orientation) is reflected in the other image.

Other two-dimensional shapes may be used instead of a box 40. The user places or manipulates the two-dimensional shape in one or both planar images for extrapolation of the volumetric clipping shape.

In alternative embodiments, the processor 12 automatically positions, orients, and sizes the clipping shape. The valve or features of the valve or heart may be detected. The clipping shape is positioned based on the detected valve or features.

The volumetric clipping shape defines a sub-volume. The data represents a volume, such as part or all of the heart. The volumetric clipping shape defines a sub-set of the volume and corresponding data. In the example of FIG. 3, the rectangular prism represented by the boxes 40 in the planar images indicates a sub-volume. The sub-volume includes the valve, but does not include locations of the heart outside of the rectangular prism. The clipping shape may be entirely within the volume so that locations surrounding the clipping shape are excluded. The clipping shape may be at an edge of the volume so that the exclusion is on multiple but fewer than all sides (e.g., four or five sides of a rectangular prism).

The data representing the locations within the clipping shape is used for volume rendering by the processor 12. The data for locations outside the clipping shape is not used for volume rendering. The data for locations on the clipping shape boundary or surface are or are not used.

The clipping shape defines locations or voxels. For static imaging, the same frame or volume data set is used for clipping positioning and rendering. For dynamic or real-time operation, the clipping shape is positioned while images from one or more frames of data are displayed and the resulting volume rendering may be from yet other frames of data. The clipping shape defines the locations used for then selecting the data from which to render the sub-volume or clipped volume. The data in the portion of the volume within the clipping shape is used for rendering, and data outside the clipping shape is not used.

The processor 12 volume renders from the selected sub-set. Any type of volume rendering may be used, such as surface rendering or projection rendering. For example, a viewing direction is established relative to the clipped volume. Rays extend in parallel or diverging from a virtual viewer through the clipped volume. Data along each ray is used to determine one or more pixel values. For example, the first datum along each ray that is above a threshold is selected and used for that ray. Other rendering may be used, such as using alpha blending and/or fragment and vertex processing.

Any number of images may be volume rendered from the clipped volume (e.g., the selected sub-set). In one embodiment, two or more images are volume rendered based on the same clipping. The different rendered images correspond to different viewing directions. Other characteristics, such as the mapping transform, type of volume rendering, or diverging verses parallel view lines, may be the same or different for the different images.

The processor 12 generates a plurality of three-dimensional representations of the volume from the clipped data. Each three-dimensional representation has a viewing angle relative to the volume. The different viewing angles may be evenly distributed, such as on substantially opposite sides. Substantially is used to provide for angles other than 180 degrees (e.g., +/−20 degrees), but still viewing from a direction perceived as opposite (e.g., the inflow and outflow may have an offset angle due to the shape or operation of the valve). Irregular distribution of viewing directions may be used.

The viewing angles are selected based on the clipping shape. For example, the viewing angles are set to be orthogonal or relative to specific sides of the clipping shape. The user may indicate the sides to use, or the sides are predetermined. In the box example, the top and bottom sides are used relative to the image on which the user starts the placement of the box 40. The user may select the sides or change the sides. Automatic setting may be used, such as setting relative to a standard view (e.g., AC4).

Each of the different images is rendered from the same data. For example, the images are part of a static volume (e.g., frozen). As another example, continuous playback with processing sufficient to perform multiple renderings in real-time speed renders from the same data. Alternatively, different data is used for the different rendered images to provide substantially simultaneous images from different viewing directions. Simultaneous display is perceptual. While the images may be sequentially added to the display, the user perceives the images as being displayed at a same time. Substantially accounts for flicker or other artifacts that may not be desired, but provide the different images in a way that the user appreciates is within at least half a heart cycle or other relevant physiological cycle of each other.

Figure 4:
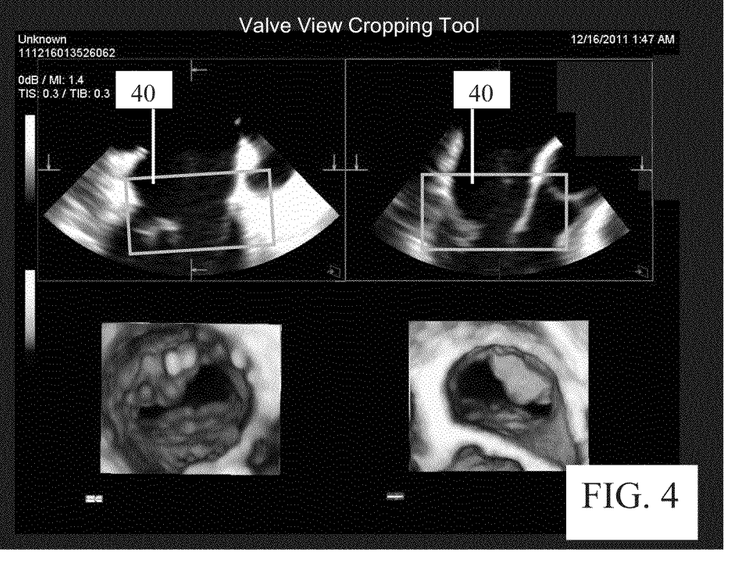
FIG. 4 shows example planar and volume rendered medical images after positioning of a clipping box, according to another embodiment.

In one embodiment represented in FIG. 3, the volume renderings are performed and displayed while the clipping shape is configured. Once the clipping shape is initially placed or defined, a sub-volume is selected. The processor 12 renders the different images from the clipped volume for substantially simultaneous display. As the user changes the clipping shape, such as translating, rotating, or scaling, different locations are included and/or excluded from the clipping. The resulting different sub-volume is used for further volume rendering. The volume rendered images resulting from the changes in the clipping are displayed to assist the user in determining a desired clipping. In alternative embodiments, the volume rendered images are generated after activation of rendering by the user or no changes to the clipping shape for a threshold amount of time. FIG. 4 shows two volume rendered images from different view directions based on a final or finished clipping. The user may arbitrate to the clipping box 40 in either MPR to resize, rotate, and/or reposition the clipping volume.

The display 16 is a CRT, LCD, plasma, monitor, projector, printer, or other now known or later developed display device. The display 16 displays the planar image or images with or without a representation of the clipping shape. The display 16 displays one or more volume rendered images.

For example and as shown in FIGS. 2-4, a quad display is shown. The display 16 is divided into four image regions, but more or fewer image regions may be used. Two of the image regions are for planar images, such as planar reconstruction of orthogonal planes in the volume. The clipping shape may be represented on none, one, or both of the planar images. Two of the regions are for substantially simultaneous display of volume rendered images from different directions.

In the valve embodiment, the in-flow and out-flow tracts of the valve are shown. The user selects the valve using a volumetric clipping shape. The different volume rendered images relative to the volumetric clipping shape are generated. The user may adjust the viewing direction of one or more of the rendered images to view the in-flow and out-flow tracks as desired.

Figure 5:
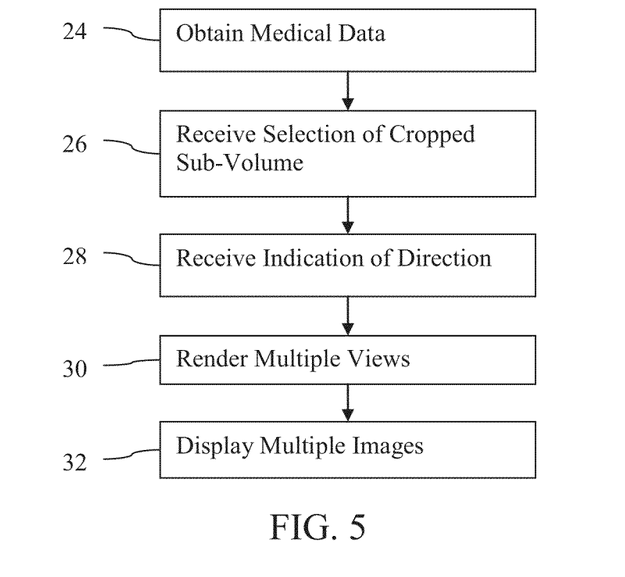
FIG. 5 is a flow chart diagram of one embodiment of a method for volume rendering in three-dimensional medical imaging.

FIG. 5 shows a method for volume rendering in three-dimensional medical imaging. The method is implemented by a medical diagnostic imaging system, a review station, a workstation, a computer, a PACS station, a server, combinations thereof, or other device for image processing medical ultrasound or other types of volume data. For example, the system 10 or computer readable media 14 and processor 12 shown in FIG. 1 implement the method, but other systems may be used.

The method is implemented in the order shown or a different order. For example, acts 26 and 28 may be reversed or performed simultaneously. Additional, different, or fewer acts may be performed. For example, acts 30 and/or 32 provide for one view rather than multiple views. As another example, acts associated with operations by the user are included, such as positioning the transducer, activation of the process and/or input of clipping selections. In yet another example, one or more planar images are generated and displayed prior to act 26 being performed.

The acts 24-32 are performed in real-time, such as during scanning. The user may view images while scanning. For real-time imaging, the volume data used for any given rendering may be replaced with more recently acquired data. For example, an initial rendering is performed with one set of data. The final rendering is performed with another set of data representing the same or similar (e.g., due to transducer or patient movement) volume. In alternative embodiments, a same data set is used for all of the acts 26-32 either in real-time with scanning or in a post scan review.

In act 24, medical data representing a volume of a patient is obtained. The data is obtained from memory or from scanning. Any modality may be used. In one embodiment, the heart of a patient is scanned with ultrasound, such as for B-mode scanning. For scanning, an ultrasound transducer is positioned adjacent, on, or within a patient. A volume scanning transducer is positioned, such as a mechanical wobbler or multi-dimensional array. For adjacent or on a patient, the transducer is positioned directly on the skin or acoustically coupled to the skin of the patient. For within the patient, an intraoperative, intercavity, catheter, transesophageal, or other transducer positionable within the patient is used to scan from within the patient.

The user may manually position the transducer, such as using a handheld probe or manipulating steering wires. Alternatively, a robotic or mechanical mechanism positions the transducer.

The volume region of the patient is scanned, such as scanning an entire heart or portion of the heart from the esophagus or through another acoustic window. For example, the data represents at least a portion of the heart of a patient where the portion includes one or more valves. Other organs or parts of a patient may be scanned. The wobbler or multi-dimensional array generates acoustic energy and receives responsive echoes. In alternative embodiments, a one-dimensional array is manually moved for scanning a volume.

One or more sets of data are obtained. The ultrasound data corresponds to beamformed data, detected data, and/or scan converted data. The ultrasound data represents a region of a patient. Data for multiple planar slices may represent the volume region. Alternatively, a volume scan is used. The region includes tissue, fluid or other structures. Different structures or types of structures react to the ultrasound differently. For example, heart muscle tissue moves, but slowly as compared to fluid. The temporal reaction may result in different velocity or flow data. The shape of a structure or spatial aspect may be reflected in B-mode data. One or more objects, such as the heart, an organ, a vessel, fluid chamber, clot, lesion, muscle, and/or tissue are within the region. The data represents the region.

In act 26, a processor receives a selection of a sub-volume of the volume. The selection is received from a user input. Based on user interface controls, the user indicates a type, size, location, orientation, or other characteristic of a clipping volume. The user may position a box 40 or other shape on an image. By selecting a region of interest in a planar image or multiple planar images representing different planes in the volume, the selection of the sub-volume is performed. For example, A4C view, an A2C view, a LAX, or other standard view of the heart are displayed for user indication of a region of interest. The placement indicates locations in the area and may be extrapolated to a volume by extension in a predetermined or user selected way.

In one embodiment, the selection is based on a rectangular prism. A rectangular prism has six flat sides, all at right angles. In one example, the rectangular prism is a cube, where all six sides are equal and square. Non-flat, other numbers of sides, or other shapes may be used. The rectangular prism has six sides lying in six planes. By positioning a box 40 in a planar image, the location of four planes orthogonal to the displayed plane is determined. For example, the user selects a position for a top of the box 40 in a planar image with a single trackball or mouse click at the desired location for the center of the top line. For the valve embodiment, the user positions the cursor above the mitral valve in the left ventricle. Upon selection, the trackball may be arbitrated to the position desired for the bottom of the box 40. As the user moves the cursor away from the original selection, the locations and dimensions of the clipping volume or object are determined while the intersection of the clipping volume is displayed in each planar image. Other processes for user entry of the clipping shape may be used.

The position of the user placed box 40 on a planar image is used to define a volumetric shape. The position of the other two planes and corresponding depth of the four planes is based on predetermined criteria or selection in another planar image. The six planes intersect with each other defining the enclosing rectangular prism. Locations within the rectangular prism are selected by this clipping. The selection indicates a clipping volume.

Manual placement is used. In an alternative embodiment, the selection is received from a processor. Automated placement by analyzing the volume data and identifying the target location is used. For example, a processor detects a valve location. A clipping volume sufficient to include the valve while excluding as much other structure as possible is defined by the processor using fitting or scaling operations. In another embodiment, the clipping volume is placed at a preset location based on the examination (e.g., crop at an aortic valve position), view window (e.g. mid-esophageal), and desired target (e.g. aortic or mitral valve). Semi-automated approaches may be used, such as user identification of a feature and processor-based placement of the clipping volume using the feature.

The selection is based on clipping or cropping. The part of the scan volume of interest is selected. The part is a volume itself, such as being formed from locations or voxels distributed in three-dimensions. The clipping volume defining the selected locations has an enclosed shape. The received selection is of the clipped volume. For example, the clipped volume surrounds and includes a valve. Locations representing the valve or adjacent tissue are included and other locations outside the clipping volume are excluded.

The clipping volume is surrounded by excluded locations. For example, the clipping volume is within the scan volume and surrounded on each side by locations of the scan volume. Alternatively, the clipping volume is at a side of the scanning volume, so is not surrounded.

In act 28, an indication of the viewing direction relative to the clipping volume is received. A processor receives the indication from user interface operation or from data processing. For example, a user selection of a clipping volume to be placed, selection relative to an already selected clipping volume, or other location selection indicates one or more viewing directions. The shape of the clipping volume may be associated with predefined viewing directions. For example, orthogonal lines on opposite sides of a rectangular prism are predefined as being the viewing directions. The indication is provided by orientation of the clipping volume. The user may adjust the viewing angles. The user may select sides or lines relative to the clipping shape after or as part of positioning the clipping shape. For example, a box 40 is positioned by first selecting the location for one line. This line defines one side for which a viewing angle is orthogonal. The user then indicates a position of another, opposite line of the box 40. This side defines another side for which the other viewing angle is orthogonal. Act 26 and 28 may be manually input by the user, computed by processor 12, or from a preset value.

In the valve imaging embodiment, the viewing angles are set relative to the in-flow and out-flow regions. For example, the top and bottom lines selected by the user to initially position the clipping rectangular prism define the in-flow and out-flow directions. By positioning and orienting the clipping volume, the predefined or user selected viewing directions are indicated for viewing the in-flow and out-flow regions, such as parallel or along a direction of flow.

The user may adjust the viewing directions to provide the desired views of the valve. The adjustment is performed by entering an angle, orienting the clipping volume, moving a line representing the viewing direction, or other mechanism. The user may adjust the clipping shape in orientation to change the viewing direction.

The sub-volume is rendered from different directions. In one embodiment, the directions are substantially opposite. Other relative viewing directions may be used, such as within 90 degrees of each other. Different anatomy may have different locations and/or directions for viewing diagnostically useful information. These locations and directions of interest may be predetermined relative to a clipping object based on the imaging application.

In act 30, the sub-volume defined by the clipping volume is volume rendered. The volume rendering is a projection, surface, or other rendering. The type or other characteristics of the volume rendering are based on predetermined settings or user selections. The data used for the volume rendering is of locations within the sub-volume or clipping volume. The view directions are based on the anatomy being selected, either through predetermined, processor identified, or user input indication. For example, opposite viewing directions are used for rendering images of a valve from in-flow and out-flow directions.

The data representing the volume is medical data. The data represents the patient, such as from a scan of an interior portion of the patient. The data represents the volume at a given time. While the scan may be acquired over a period (e.g., milliseconds or seconds), the result is treated as representing the patient at a given time. For a given time, the same data is used for volume rendering the multiple views. The different images may change as further data is acquired, such as showing the valve operating over time by rendering images in sequence for each of the views. For a static display, one set of data is used to generate the different views for frozen display (e.g., the heart valve at a particular time).

By rendering with the clipping, selected data is used for rendering and non-selected or clipped data is not. Intervening heart tissue in the valve example is not included. Data outside the clipping volume is not used. The clipping is a volumetric enclosure, allowing rendering of desired information while limiting other information. This may avoid limiting visibility of the valve or other region of interest. The images may more clearly represent the valve and valve operation without occlusion or confusion caused by tissue in-front of or behind the valve relative to the viewing direction. Limiting data from lateral locations or orthogonal to the viewing direction may provide better focus on the valve tissue of interest.

By adjusting location, orientation, and/or scale, different data is selected at different times. Since the rendering relies on the data selection, different renderings result. For example, the user clicks on or selects the box 40 of FIG. 3 or 4. Using click-and-drag, rotation widgets, or other input operations, the sub-volume selection is changed. The rendered images are also changed accordingly. Once complete, the user may un-arbitrate the cursor from clipping control with a click or other activation.

The clipped volume is rendered from different directions in one embodiment. The different directions are opposite directions, such as from different sides of the clipping volume. In the valve example, the renderings are along the viewing directions into the in-flow and out-flow regions.

In act 32, the images are displayed. The volume rendered images are displayed. The three-dimensional representations are displayed statically. In another embodiment, the data changes as a function of time, such as to show the operation of the valve. The three-dimensional representation is of the same viewing angle, but the data changes to show changes in the heart from that diagnostic view over time. As the data changes, the volume rendering and resulting display are repeated with the new data.

The three-dimensional representation is maintained at the selected view until an indication of another view is received, such as from a user input adjusting the clipping volume. As the user adjusts the clipping volume, different volume renderings due to the change in data being selected are displayed.

Any display format may be used. For displaying volume renderings from different directions, the display may be divided into regions. The different images are displayed in the different regions. Alternatively, sequential display from the different viewing directions is used.

The volume rendered images are displayed without other images. For example, if acts 26 and 28 are automated by processor 12, it is not necessary to view MPRs with clipping box graphics for initial positioning of the clipping box. As another example, MPRs are used for defining the clipping volume, and then the display lay out is changed to show only VR images. Alternatively, the volume rendered images are displayed with planar images. For example, a plurality of two-dimensional images representing planes through an ultrasound scan volume is displayed. The images are displayed at a same time, but may be displayed sequentially. For example, two two-dimensional images corresponding to substantially orthogonal planes at standard locations relative to the heart are displayed in two different quadrants of a screen or display arrangement. In this echocardiography example, canonical slice(s) or planes, such as apical four chamber (A4C) and apical two-chamber (A2C) views, are extracted from the data representing the volume.

In one embodiment represented in FIGS. 2-4, a quad display is used. The upper two medical images are planar images from different planes through a heart volume. The planar images are used for diagnosis and/or positioning of the clipping volume. The lower two medical images are volume rendered images of the clipped volume or from data at locations included in and not excluded from the clipping volume. The four images are displayed substantially simultaneously. Other formats may be used with more or fewer images.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for volume rendering in three-dimensional medical imaging, the method comprising:
   obtaining medical data representing at least a portion of a heart of a patient, the portion including a valve having in-flow and out-flow regions;
   receiving a selection of a clipping volume surrounding the valve and excluding locations of the portion outside the clipping volume, the clipping volume comprising a predetermined clipping structure having a three-dimensional clipping shape;
   rendering, from the medical data, the valve as viewed from the in-flow region and as viewed from the outflow region, the rendering using the medical data representing the clipping volume and not using the medical data representing the locations outside the clipping volume;
   displaying first and second images substantially simultaneously, the first and second images being of the rendered valve as viewed from the in-flow region and as viewed from the out-flow region, respectively; and
   receiving an indication of the in-flow region or the out-flow region with the selection of the clipping volume, wherein the indication is a first side of the clipping volume as oriented relative to the valve, and wherein rendering comprises rendering from the first side and a side opposite the first side of the clipping volume.

2. The method of claim 1 wherein obtaining the medical data comprises scanning the heart with ultrasound.

3. The method of claim 1 wherein receiving the selection comprises determining six planes based on the selection, the six planes comprising sides of the clipping volume.

4. The method of claim 1 wherein rendering comprises volume rendering of the valve.

5. The method of claim 1 wherein the clipping volume is entirely within the portion such that the medical data represents locations surrounding the clipping volume, and wherein rendering comprises rendering for locations within the clipping volume and not for the locations surrounding the clipping volume.

6. The method of claim 1 wherein displaying comprises displaying the first and second images as a user adjusts the clipping volume.

7. The method of claim 1 wherein receiving the selection comprises receiving the selection from an output of automated valve detection by a processor.

8. A method for volume rendering in three-dimensional medical imaging, the method comprising:
   obtaining medical data representing at least a portion of a heart of a patient, the portion including a valve having in-flow and out-flow regions;
   receiving a selection of a clipping volume surrounding the valve and excluding locations of the portion outside the clipping volume, the clipping volume comprising a predetermined clipping structure having a three-dimensional clipping shape;
   rendering, from the medical data, the valve as viewed from the in-flow region and as viewed from the outflow region, the rendering using the medical data representing the clipping volume and not using the medical data representing the locations outside the clipping volume; and
   displaying first and second images substantially simultaneously, the first and second images being of the rendered valve as viewed from the in-flow region and as viewed from the out-flow region, respectively;
   wherein receiving the selection comprises:
   displaying third image representing a plane through the heart;
   receiving a position of a user placed box on the third image; and
   determining the clipping volume from the box.

9. A method for volume rendering in three-dimensional medical imaging, the method comprising:
   obtaining medical data representing at least a portion of a heart of a patient, the portion including a valve having in-flow and out-flow regions;
   receiving a selection of a clipping volume surrounding the valve and excluding locations of the portion outside the clipping volume, the clipping volume comprising a predetermined clipping structure having a three-dimensional clipping shape;
   rendering, from the medical data, the valve as viewed from the in-flow region and as viewed from the outflow region, the rendering using the medical data representing the clipping volume and not using the medical data representing the locations outside the clipping volume; and
   displaying first and second images substantially simultaneously, the first and second images being of the rendered valve as viewed from the in-flow region and as viewed from the out-flow region, respectively;
   wherein displaying comprises displaying at least four images simultaneously, the four images including the first and second images as volume renderings of the valve and third and fourth images representing planar regions through the heart, and wherein receiving the selection comprises receiving placement of a region of interest in at least the third image or the fourth image.

10. A system for volume rendering in three-dimensional medical imaging, the system comprising:
    a memory operable to store data representing a volume of a patient;
    a user input;
    a processor configured to:
        generate, in response to input from the user input, a clipping shape as a single predetermined object having an enclosed volumetric surface;
        clip the volume with the clipping shape, the clipping defining a sub-set of the data;
        receive an indication of at least one of the different viewing directions with the generation of the clipping shape, where the indication is a first side of the clipping shape as oriented relative to the volume; and
        volume render different images from the sub-set, the different images being of the sub-set of data the first side and a side opposite the first side of the clipping shape; and
    a display operable to display the different images.

11. The system of claim 10 wherein the clipping shape comprises a rectangular prism.

12. The system of claim 11 wherein the processor is configured to generate a planar image representing a plane in the volume and to extrapolate the rectangular prism from a box on the planar image, the box input from the user input.

13. The system of claim 10 wherein the processor is configured to volume render and the display to display the different images substantially simultaneously.

14. The system of claim 13 wherein the processor is configured to volume render the different images while a characteristic of the clipping shape is changed in response to further input from the user input.

15. The system of claim 10 further comprising:
    an ultrasound transducer;
    a beamformer connectable with the ultrasound transducer, wherein the data is a function of an output of the beamformer.

16. In a non-transitory computer readable storage medium having stored therein data representing instructions executable by a programmed processor for volume rendering in three-dimensional medical imaging, the storage medium comprising instructions for:

obtaining medical data representing a volume of a patient;

receiving selection of a sub-volume of the volume, the sub-volume being defined by a predetermined rectangular prism as a single object clipping along three spatial dimensions;

rendering, from the medical data, the sub-volume from first and second viewing directions, the rendering using the medical data representing the sub-volume and not using the medical data representing locations outside the sub-volume; and displaying first and second images substantially simultaneously, the first and second images being of the rendered sub-volume from the first and second viewing directions, the displaying being of at least four images simultaneously, the four images including the first and second images as volume renderings and third and fourth images representing planar regions through the volume, and wherein receiving the selection comprises receiving placement of a region of interest in at least the third image or the fourth image.

17. The non-transitory computer readable storage medium of claim 16 wherein receiving the selection comprises receiving an indication of an enclosed volumetric clipping shape, the sub-volume being within the enclosed volumetric clipping shape, and wherein rendering comprises rendering the sub-volume from substantially opposite directions set relative to the indication.

18. A system for volume rendering in three-dimensional medical imaging, the system comprising:

a memory operable to store data representing a volume of a patient;

a user input;

a processor configured to:
generate, in response to input from the user input, a clipping shape as a single predetermined object having an enclosed volumetric surface;
clip the volume with the clipping shape, the clipping defining a sub-set of the data; and
volume render different images from the sub-set, the different images being of the sub-set of data from different viewing directions; and a display operable to display the different images;

wherein the different images comprise at least two images as volume renderings of the volume, and wherein the processor is configured to generate third and fourth images representing planar regions through the volume, and wherein the processor is configured to receive a selection of at least one of the different view directions as placement of a region of interest in at least the third image or the fourth image.

19. In a non-transitory computer readable storage medium having stored therein data representing instructions executable by a programmed processor for volume rendering in three-dimensional medical imaging, the storage medium comprising instructions for:

obtaining medical data representing a volume of a patient;

receiving selection of a sub-volume of the volume, the sub-volume being defined by a predetermined rectangular prism as a single object clipping along three spatial dimensions;

rendering, from the medical data, the sub-volume from first and second viewing directions, the rendering using the medical data representing the sub-volume and not using the medical data representing locations outside the sub-volume;

displaying first and second images substantially simultaneously, the first and second images being of the rendered sub-volume from the first and second viewing directions; and receiving an indication of the first or second view direction with the receiving of the selection of the sub-volume, where the indication is a first side of the sub-volume as oriented relative to the volume, and wherein rendering comprises rendering from the first side and a side opposite the first side of the clipping volume.

\* \* \* \* \*